3,291,287
CONVEYOR
Karl Rehm, Konstanz, Germany, assignor to Telefunken Patentverwertungs-G.m.b.H., Ulm (Danube), Germany
Filed Dec. 16, 1964, Ser. No. 418,743
Claims priority, application Germany, Dec. 24, 1963, T 25,356
7 Claims. (Cl. 198—190)

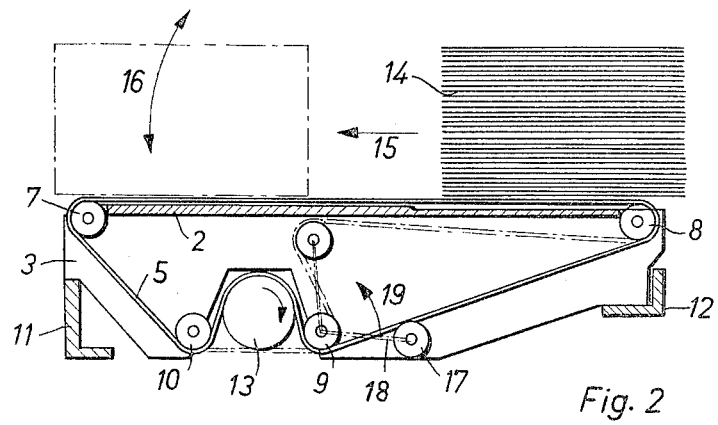
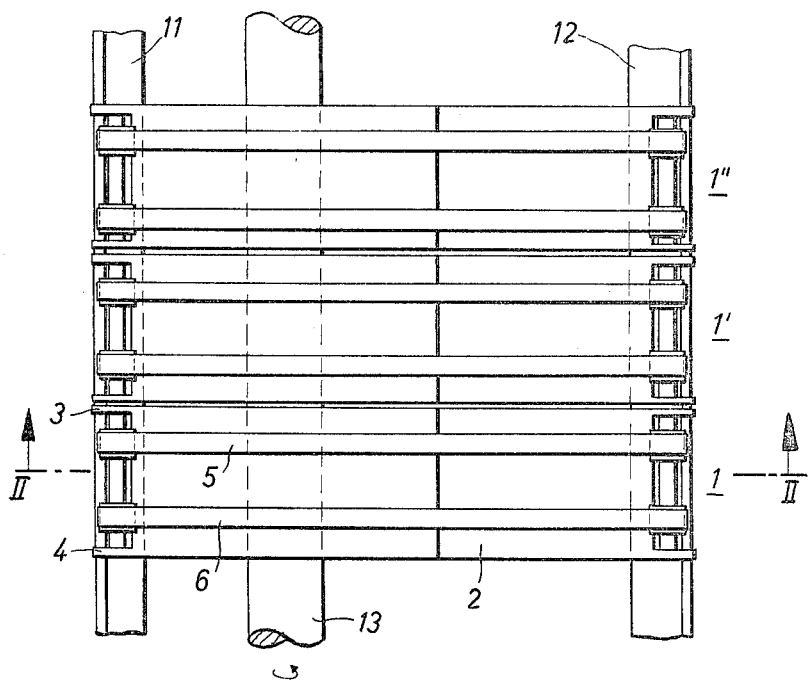

The present invention relates generally to a document handling machine, and, more particularly, to such machines which comprise a plurality of endless conveyor belts or groups of such conveyor belts arranged parallel and side by side and which are applicable to document sorting machines with stacking devices wherein the stacks formed are each lowered onto conveyor belts traveling in a horizontal direction and are conveyed by these belts from the stacking compartment to an extraction position.

When a plurality of such conveyor belts is arranged side by side, each of these belts could be guided around two guide rollers and the guide rollers could be mounted at one end on a continuously driven shaft. In order to render possible the replacement of the individual belts in such a construction, the drive shaft has to be composed of individual shaft sections which are coupled together, which necessitates a considerable expenditure on component parts. In addition, the whole conveying device has to be stopped during the replacement operation. This disadvantage would not arise with individual drive of the belts or groups of belts, but the expense would in no way be reduced.

With this in mind, the main object of the present invention is to avoid the above-noted disadvantages.

Another object of the invention is to provide a device of the character described wherein the individual belts may be changed without stopping the entire conveying device.

These objects and others ancillary thereto are accomplished in accordance with preferred embodiments of the present invention wherein the conveyor belts, which are allocated to the individual stacking compartments for example, are each mounted in a conveyor unit which can be inserted in the machine frame and removed therefrom individually. A shaft which is mounted in the machine frame transversely to the conveyor belts but around which the conveyor belts do not pass, serves as a drive member for the conveyor belt or belts in these conveyor units which are arranged side by side.

Additional objects and advantages of the present invention will become apparent upon consideration of the following description when taken in conjunction with the accompanying drawings in which:

FIGURE 1 is a plan view of a portion of a stack conveying device of a document sorting machine constructed in accordance with the present invention.

FIGURE 2 is a sectional view taken substantially along the plane defined by reference line II—II of FIGURE 1.

With more particular reference to the drawings, FIGURE 1 shows all the conveyor units 1, 1' 1", to be alike in construction so that the following description can be restricted to one of them. All the movable parts in the conveyor unit 1 are mounted in a shell-like housing which is open at the bottom and which forms a conveyor table 2 and has two side walls 3 and 4. Each of the endless conveyor belts 5 and 6 passes around four guide rollers 7, 8, 9, 10, each of which is mounted on a respective common shaft together with the respective guide roller for the associated belt.

The stack conveying device of the document sorting machine also comprises two supporting rails 11 and 12 which are rigidly connected to the machine frame, and a shaft 13 which is mounted in the machine frame transversely of the conveyor belts 5, 6, etc., and can be driven in the direction of the arrow and which acts directly on the conveyor belts. An appropriate cutout is provided in the side walls 3, 4, for the passage of the shaft 13.

When the conveyor units 1, 1', 1", etc., are inserted in the machine frame, they bear with their side walls 3, 4 on the rails 11, 12. As a result of the particular arrangement of the guide rollers 9 and 10, the conveyor belts are in engagement with the shaft 13 over a portion of the circumference of this shaft, but without passing around the shaft, as can be seen in FIGURE 2 with reference to the endless conveyor belt 5. Accordingly, when a stack of documents 14 formed in the stacking device is lowered onto the conveyor table 2 of the conveyor unit 1 (which may be done by means of a device which is not illustrated in the drawing because it does not form part of the present invention) it can be moved by means of the conveyor belts 5 and 6 in the direction of the arrow 15 into the extraction position.

Each of the conveyor units can be removed from the machine frame individually and without interrupting the operation of the others. The double arrow 16 in FIGURE 2 indicates the direction of pivoting for removal and re-insertion. In order to prevent the endless conveyor belts from becoming loose and thus being capable of sliding off the guide rollers when the conveyor unit is raised, a tension roller, corresponding to the tension roller 17 in FIGURE 2, is allocated to each belt.

The roller 17 is mounted on an arm 18 which is only illustrated diagrammatically. This arm is pivotable about the axis of the roller 9 and is biased to move in the direction of the arrow 19.

When the conveyor units are taken out of the machine frame, the length of the conveyor belt freed by the absence of the engagement around the shaft 13 is compensated for by this tension roller 17. The conveyor belts and the tension roller then assume the position shown in chain line in FIGURE 2.

It will be understood that the above description of the present invention is susceptible to various modifications, changes and adaptations, and the same are intended to be comprehended within the meaning and range of equivalents of the appended claims.

What is claimed is:

1. In a document handling machine, particularly a document sorting machine, having a plurality of endless conveyor belts or groups of such conveyor belts which are arranged parallel and side by side and which serve, in particular, for conveying stacks, formed in the individual stacking devices of the machine, from the stacking compartment to an extraction position, the improvement wherein there is a plurality of conveyor units, each of which can be inserted in the machine and removed therefrom individually without interfering with the operation of the other units and in which the conveyor belts or groups of belts are each mounted and each of which includes a plurality of guide rollers on which the belt of a unit is mounted, and a common shaft mounted in the machine frame transversely of the conveyor belts serving as a drive member of the conveyor belt or belts in these conveyor units which are arranged side by side.

2. A document handling machine comprising, in combination:
   a machine frame;
   a plurality of conveyor units arranged side by side in said frame and individually removable without interfering with the operation of the other units, each unit including at least one conveyor belt and a plurality of guide rollers; and
   a common drive shaft mounted in said frame transversely of the conveyor belts for driving the belts of the units.

3. A machine as defined in claim 2 wherein said shaft and said belts are arranged so that the transmission of force from the shaft to the individual conveyor units is effected directly by the shaft to the conveyor belts.

4. A machine as defined in claim 3 wherein the guide rollers are arranged to guide the belts when the unit is in the frame so that they are in engagement with the shaft over only a portion of its circumference and do not pass around said shaft.

5. A machine as defined in claim 4 wherein each conveyor unit has a tension roller for compensating for the loose length of the conveyor belt due to the absence of engagement about the shaft when the unit is removed from the frame.

6. A device for handling documents, comprising, in combination:

a machine frame;

a plurality of parallel and side-by-side conveyor unit means on said frame each for transporting a separate stack of documents and each being removable from the frame independently of the other conveyor unit means to permit repair of one conveyor unit means without interfering with the operation of adjacent conveyor unit means, each conveyor unit means including at least one conveyor belt, the conveyor belt of each unit being of the same length as the belts of the other units; and common drive shaft means in said frame extending transversely of said conveyor unit means and positioned to cooperate therewith for driving said belts when the respective conveyor unit means is on said frame.

7. A device for handling documents, comprising, in combination:

a machine frame;

a plurality of parallel and side-by-side conveyor unit means on said frame each for transporting a separate stack of documents and each being removable from the frame independently of the other conveyor unit means to permit repair of one conveyor unit means without interfering with the operation of adjacent conveyor unit means, each conveyor unit means including at least one conveyor belt; and common drive shaft means in said frame extending transversely of said conveyor unit means and positioned to cooperate therewith for driving said belts when the respective conveyor unit means is on said frame, each conveyor unit means being open at its lower end to expose its belt and to permit direct engagement of the belt about a portion of the circumference of said shaft means when such conveyor unit means is placed onto said frame from above said shaft means.

References Cited by the Examiner
UNITED STATES PATENTS

| | | | |
|---|---|---|---|
| 2,601,929 | 7/1952 | Brichard | 198—190 |
| 2,850,148 | 9/1958 | Rasmusson | 198—190 |

EVON C. BLUNK, *Primary Examiner.*

RICHARD E. AEGERTER, *Examiner.*